No. 729,393. PATENTED MAY 26, 1903
W. NEWMAN.
KNOTTER FOR GRAIN BINDERS.
APPLICATION FILED APR. 19, 1902.

NO MODEL. 5 SHEETS—SHEET 1.

Fig. I.

WITNESSES:
Jos. A. Ryan
Edw. W. Byrn.

INVENTOR
William Newman
BY Munn & Co.
ATTORNEYS

No. 729,393. PATENTED MAY 26, 1903.
W. NEWMAN.
KNOTTER FOR GRAIN BINDERS.
APPLICATION FILED APR. 19, 1902.
NO MODEL. 5 SHEETS—SHEET 2.

WITNESSES:
Jos. A. Ryan
Edw. W. Byrn.

INVENTOR
William Newman
BY Munn & Co.
ATTORNEYS

No. 729,393. PATENTED MAY 26, 1903.
W. NEWMAN.
KNOTTER FOR GRAIN BINDERS.
APPLICATION FILED APR. 19, 1902.
NO MODEL. 5 SHEETS—SHEET 3.

WITNESSES:
Jos. A. Ryan
Edw. W. Byrn.

INVENTOR
William Newman.
BY
ATTORNEYS

No. 729,393. PATENTED MAY 26, 1903.
W. NEWMAN.
KNOTTER FOR GRAIN BINDERS.
APPLICATION FILED APR. 19, 1902.
NO MODEL. 5 SHEETS—SHEET 5.

WITNESSES:
Jos. A. Ryan
Edw. W. Byrn.

INVENTOR
William Newman.
BY
ATTORNEYS

No. 729,393.	Patented May 26, 1903.

UNITED STATES PATENT OFFICE.

WILLIAM NEWMAN, OF ALEXANDRIA, SOUTH DAKOTA.

KNOTTER FOR GRAIN-BINDERS.

SPECIFICATION forming part of Letters Patent No. 729,393, dated May 26, 1903.

Application filed April 19, 1902. Serial No. 103,704. (No model.)

*To all whom it may concern:*

Be it known that I, WILLIAM NEWMAN, of Alexandria, in the county of Hanson and State of South Dakota, have invented a new and useful Improvement in Knotters for Grain-Binders, of which the following is a specification.

My invention relates to that part of a grain-binder known as the "knotter" or the device for tying the twine in a knot after being passed around the bundle. The form of knotter generally used comprises two principal elements. One of these is the twine-holder, consisting of a disk having upwardly-projecting and notched flanges and two cutting-knives, which disk is carried on the lower end of a rotating shaft and in which holder the twine is held by being laid by the needle through the notches in the flanges with the end pinched between the flange and an external clamp. The other main feature of the knotter is the so-called "knotting-bill," which in general resembles a pair of pincers or the bill of a bird and which is carried on the lower end of a second rotary shaft and serves to loop the doubled twine around itself and then seize the doubled strands of twine and pull them through the loop to form the knot. While this type of knotter is very generally adopted, it is still subject to many imperfections, which at times cause inoperative conditions of the binder in the field and involve much delay and expense to the farmer. Such defects become doubly embarrassing when it is remembered that the ordinary operator of a grain-binder is an unskilled workman and cannot remedy said defects and that when anything goes wrong with the grain-binder an expert must be sent for at the expense of much delay and the loss of valuable time just when the binder is most needed and at a considerable cost to both the farmer and manufacturer.

The chief defect of the ordinary binders is the passing of bundles without tying the knot necessary to bind them. This is due to a variety of causes more or less obscure. Generally speaking, it is owing to defects in the holding device for the twine and in the knotting-bill, some of which defects are caused by faults of construction, some by wrong principles, some by wear, some by variations in the thickness of the twine, and some by still other causes.

My invention is directed to the curing of these faults in the type of knotter described; and to that end it consists in the various features of improvement which I will now proceed to describe with reference to the drawings, in which—

Fig. 7 is a vertical transverse section through the knot-tying device, taken on lines 7 7 of Figs. 1, 2, 3.

In the drawings, Fig. 1, A represents the oscillating needle-shaft, located below the inclined and slotted table B and carrying the curved needle, shown in dotted lines, which curved needle rises through a slot in the inclined table, passes through the descending grain on the table, and passes also through the breastplate C above, on which are mounted the knotting devices, which tie the knot and sever the twine. The bundle-supporting arms D then drop back out of the way, as indicated by the dotted position, and the discharging-arms E above the breastplate, revolving in the direction of the arrow, strike against and positively discharge the bundle.

The knotting devices consist of the following parts: A horizontal shaft F is journaled in a frame G, mounted in upright position on the breastplate C. Rigidly attached to the shaft F is a wheel W, having two portions of circles of teeth arranged concentrically on the side of the wheel and at different distances from the center. The series of teeth of larger diameter serve to turn the knotting-bill shaft S through bevel-gear $s$, and the series of shorter diameter nearer the center turns the twine-holder shaft T through bevel-gear $t$. These two shafts are journaled in bearings on axial lines radial to the wheel, and the twine-holder has on its lower end the flanged and notched disk, with diametrically-arranged knives of the type already described, while the knotting-bill coöperates therewith close beside the same and immediately above the breastplate.

As so far described the construction does not differ from that already in common use.

I will now proceed to describe my improvements.

In constructing the breastplate it has heretofore been customary to form it with two deep ribs or flanges extending longitudinally along the same on its under side, said ribs being formed on or cast with the breastplate in order to give it sufficient stiffness. These deep ribs hold the bundle of grain some distance below the upper surface of the breastplate and the knotting-bill, and the result is that these ribs, holding down the stalks of grain, leave a considerable space of a generally triangular shape between the twine and the gavel of grain, so that the knot cannot be tied close down to the gavel, and this space has to be taken up by the expansion of the bundle after the knot is tied, which makes a more more or less loose sheaf and uses an unnecessary quantity of twine. In overcoming this difficulty I make the bottom of the breastplate flat or without stiffening ribs or projections on the under side and place two stiffening-flanges $c$, Figs. 1, 3, 7, on the upper side of the breastplate, extending longitudinally along the side edges of the same. With this construction the bundle of grain lies close up to the bottom of the breastplate and the shortest possible distance from the knotting-bill, and there is no considerable triangular space between the twine and the bundle at this point, with the result that the bundle is bound with the knot much closer down to the grain, and therefore is much more tightly bound, and the waste of just so much twine is avoided.

Figures 4, 6:
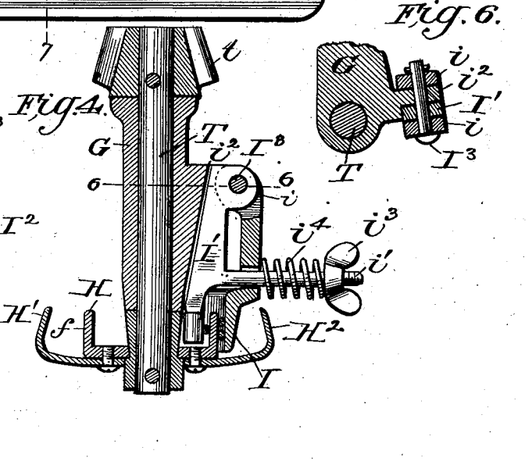
Fig. 4 is a vertical sectional detail taken through the twine-holder.
Fig. 6 is a detail cross-section on line 6 6 of Fig. 4.
Figure 8:
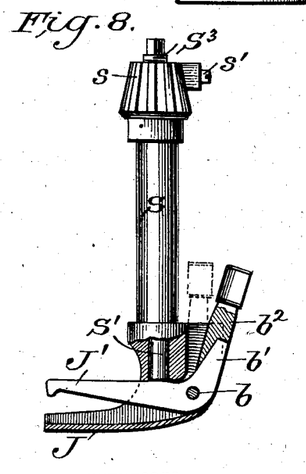
Figs. 8 and 9 are respectively a sectional side view and a rear view of the knotting-bill and its accessories.
Figure 9:
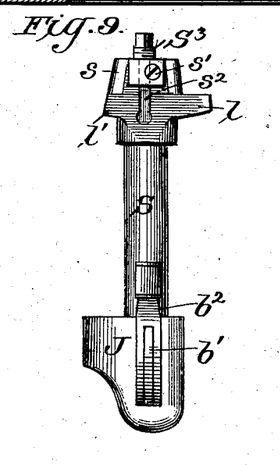

Referring now to the twine-holder, Figs. 14, 17, 18, 19, this is shown at H, and, as before indicated, consists of a disk bearing an upwardly-projecting flange around its margin, which flange is provided with four notches $h$ $h'$ $h^2$ $h^3$ on its upper edge for catching the twine, which twine has its end clamped between the outer periphery of this flange and an external clamp I. The twine-holder is mounted on the lower end of its turning-shaft T, which latter at its upper end bears a bevel-pinion $t$, that is intermittently engaged and turned by the interrupted cog-teeth $t'$ on the wheel W, Figs. 1 and 10. The twine-holder also has two oppositely-arranged knives H' H², consisting of radial arms extending from the bottom of the notched disk and turned up at the ends and sharpened on their forward edges. These, after the twine has been looped around the bundle and the end and middle part of the twine are held by the clamp, serve to cut the twine immediately after the knotting-bill ties the knot. These general instrumentalities and mode of action are old. They are subject, however, to a serious defect, which can be best illustrated with reference to Fig. 13, which shows the old arrangement. In this case the end 1 of the twine, it will be seen, extends from about a middle point between the clamp and the flange of the disk or about half-way between the two adjacent notches through which the twine is laid. There is also always a short piece of twine left between the clamp and the flange of the disk as a cut-off wasted end from the preceding bundle, and as the twine is more or less uneven in thickness, if the piece is a little thicker than the secured end of the twine, said short piece of twine holds the clamp and flange apart, and the end of the twine, which should be tightly pinched and held, slips out and the bundle is missed. It is not possible with the old construction to have the secured end 1 of the twine laid the full distance between the clamp and flange or from notch to notch of the flange, for the reason that the cutting-knife has to be made quite short to escape in its revolution the knotting-bill, which lies close beside it and is made to trend or point in the direction of the twine-holder in order to facilitate the dislodgment of the knot from the bill after the knot is tied. It has therefore with the construction of twine-holder already in use not been possible to avoid the slipping out of the twine from its holder, and when it slips out the machine generally misses three bundles before the twine catches again. This defect has cost the reaper companies thousands of dollars for the sending of experts to the machine to adjust the twine-holder, and after it is adjusted the slightest change in the kind of twine repeats the difficulty, causing, in addition to the expense to the manufacturer, great embarrassment and delay to the farmer at a critical time in his harvest. I overcome this difficulty in the following way, reference being had to Figs. 14 and 4: To prevent the twine from getting loose from the holder H, I provide two novel features. In the first place I pinch the twine $x^2$ at two points in the holder—one on the exterior of the flange $f$ of the disk and between said flange and the clamp I, and the other inside the flange of the disk and between the inside wall of said flange and a clamp-finger I', which to reduce wear may have at the bearing-point a roller, as shown, but which is not absolutely necessary. To accommodate this inside clamping of the twine, the interior wall of the flange is turned true on a lathe, so that the pressure of the finger I' may be nicely adjusted and the friction uniform. This inner clamp-finger I' is spring-seated, as will be hereinafter more fully explained in the description of the novel features of clamp I. The other feature by which the slipping of the twine from the holder is avoided is as follows: The knives H' and $H^2$ are made to project a greater distance away from the center of the disk than heretofore, such extension of the knives being rendered possible by the peculiar position in which my knotting-bill is held, which gives increased room, as will be hereinafter described. The distance which the knives project from the center is such that the knife-edge will cut the twine at a distance far enough away from the notched flange $f$ of the disk H to cause the end of the twine which is held between the clamp I and the flange $f$ to extend the full distance from one notch $h$ to the next notch $h'$, and thus be pinched between the clamp I and the flange $f$ the full distance of the clamp instead of only about half-way, as shown in Fig. 13. It will be seen also that while the clamping of the twine on the outside of the flange $f$ is to some extent interfered with by the pressure of the detached end which is left in from the previous bundle, still the extent of clamping-surface is nearly double. However, the clamping effect of the finger I' on the inside is on a single strand or run of the twine and concentrates thereon its entire efficiency without being interfered with by any loose piece of twine. With my twine-holder the clamping effect of the spring-finger I' adjusts itself also automatically to variations in the twine, and actual practice shows under the most crucial tests that the twine never slips from the twine-holder.

In constructing and arranging the two parts I and I' of the clamp (see Figs. 2, 4, 5, 6) the clamp I has two upwardly-projecting lugs $i$ $i$, perforated at the top and hinged upon a pin $I^3$, passing through a lug $i^2$, cast on the stationary frame-casing G of the twine-holder. In the two branches $i$ $i$ of the clamp and lying beside the lug $i^2$ the clamp-finger I' is hinged at the top upon the same pin $I^3$ that hinges the outside clamp to the casing. Near the middle of the clamp-finger I' there is a rigidly-projecting stem $i'$, extending outwardly through a hole in the external clamp and having its end screw-threaded to receive a butterfly-nut $i^3$. Between this nut and the clamp I there lies a spiral spring $i^4$, wound about the stem $i'$. The effect of this spring is to force the external clamp against the external face of the disk-flange and by pressing on the butterfly-nut to pull the finger-clamp I' against the inner wall of the flange of the disk, thus putting at one time a yielding pressure upon the twine outside the flange and also the twine inside the flange, which pressure adjusts itself to variations in the thickness of the twine and may be increased or diminished to suit the varying size of twine or the wear of the rubbing parts by simply turning the butterfly-nut. As the stem of the clamp-finger is not in the middle part of the bearing of the outside clamp, I form on the outside clamp a laterally-projecting arm with a presser-foot $I^2$ at its end to bear upon the flange and cause the proper balancing of the spring action on the clamp—that is to say, to cause the spring to bear at a middle point between the extreme ends of the clamp.

I will now describe the construction and arrangement of the knotting-bill and its coöperation with the twine-holder in forming the knot.

In most forms of the knotting-bill the point of the knotting-bill is made when at rest to trend or point toward the twine-holder. This is to facilitate the discharge of the knot from the bill after the bundle is tied. It is this trend toward the twine-holder that prevents the knives of the twine-holder from projecting far enough to cut off a long end to the twine, as was described as one feature of my invention with reference to Figs. 13 and 14. This trend of the knotting-bill toward the twine-holder while favoring the discharge of the knot also incidentally involves the danger of the knotting-bill not coming around far enough to grasp both strands of twine, and to prevent this it has been customary in one make of binder to form a stationary finger on the breastplate with a shoulder below it and employ a movable latch-finger just above the breastplate to hold the twine in position on the shoulder on the breastplate until the knot is tied. With this construction when the knotting-bill starts to revolve to make the loop of the knot it has to pull or force the twine off from the stationary finger on the breastplate just above the knotting-bill, which causes much trouble, for after the finger wears a little a crease is formed in it which is liable to cause the twine to hang and break. Again, as soon as the knotting-bill forces the twine off of the said finger the lower twine drops to the shoulder on the slot of the breastplate; but it often slips off the shoulder, and then when the knotting-bill comes around it misses it. Other makes of binder seek to facilitate the discharge of the bundle from the knotting-bill by a knotting-bill stripper, which draws the knot off from the bill by a positive motion; but this requires an extra cam and arm and is cumbersome. This stationary finger and supplemental latch-finger on the breastplate and also the knotting-bill stripper I dispense with by causing the knotting-bill to trend away from the twine-holder or occupy a position at right angles to the lay of the twine, (therefore not requiring the stationary finger above the knotting-bill,) the twine being held from slipping off, first, by this right-angular position, and, secondly, by a rigid guard, which I am about to describe, and then after the knot is tied and the bundle is to be discharged the knotting-bill is arranged to have an independent backward movement and in dropping back turns to a position trending toward the twine-holder, so as to facilitate the slipping of the knot from the bill. The construction and arrangement by which this result is obtained are best shown in Figs. 1, 3, 7, 8, 9, 17, 18, 19.

Figure 1:
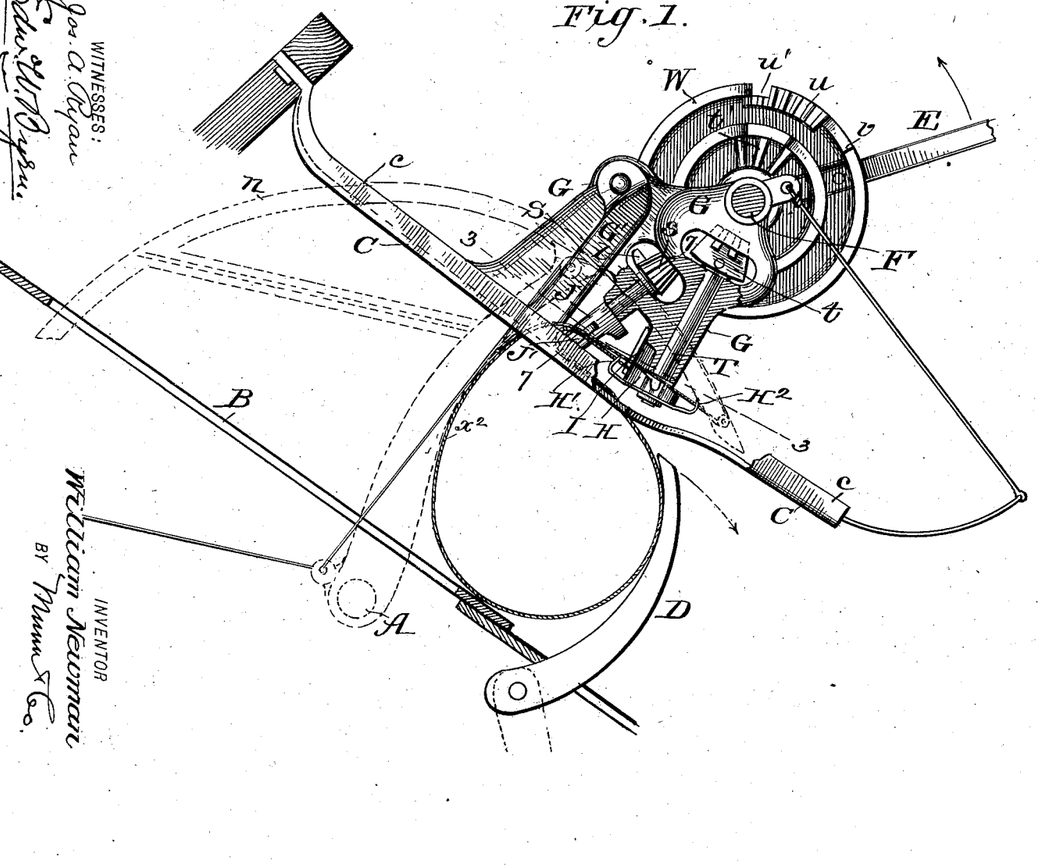
Figure 1 is a sectional view of the binder devices, showing the position of the bundle between the inclined table and the breast-plate and the knotting devices above the breastplate, the view looking endwise the bundle.
Figures 1, 5:
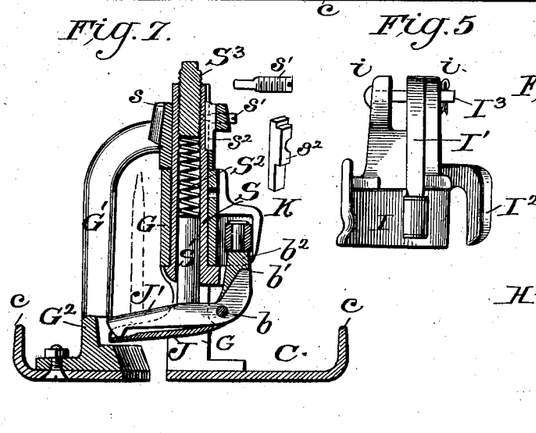
Fig. 5 is an inside face view of the clamp for the twine-holder.
Figure 2:
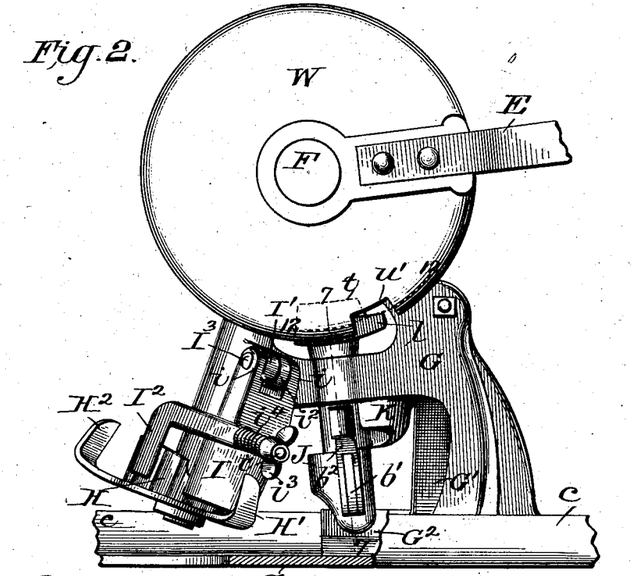
Fig. 2 is an enlarged back view of the knotting devices.
Figure 3:
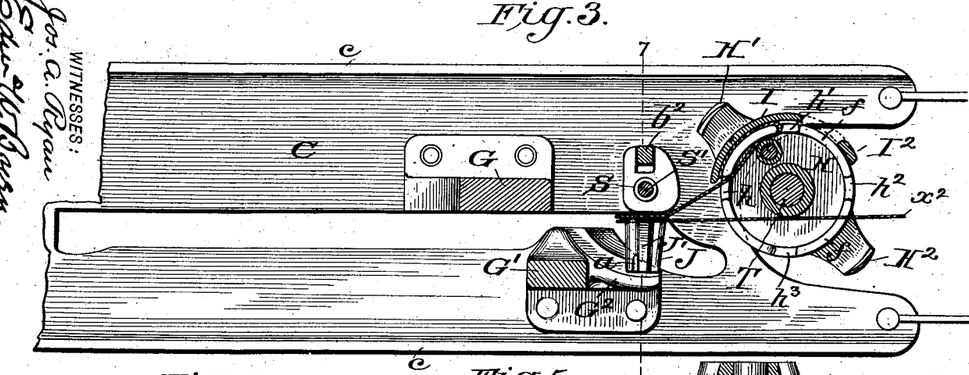
Fig. 3 is an enlarged section taken parallel with and just above the breastplate on line 3 3 of Fig. 1.

Referring first to Figs. 1, 3, and 7, it will be seen that I do not rely upon the single upright frame G on the breastplate for supporting the knotting devices, but employ a supplemental leg G', which is preferably cast in one piece with frame G, but may be cast in a separate piece, as shown, and is at its upper end bolted to the frame G and at its lower end is flanged and bolted to the breastplate, as seen in Figs. 3 and 7. This supplemental leg is on the opposite side of the slot in the breastplate from the main frame G, and its effect is to greatly brace and stiffen the support for the knotting devices. The needle passes between this supplemental leg G' and the frame G, as shown in dotted lines in Fig. 7. On the lower end of this supplemental leg I cast or form a curved guard or raceway $G^2$, in which travels the end of the knotting-bill J J'. This guard or raceway is a curve (see Fig. 3) of which the bill is the radius, and this guard acts as a stop or closure for the end of the bill through nearly ninety degrees of its sweep, so that it opposes the premature slipping of the twine off the end of the bill. (See Fig. 7.) This guard or closure is preferably made on the bottom end of the supplemental leg G'; but it may be formed on or attached to the breastplate in any desired way. The knotter-bill consists (see Figs. 3, 7, 17, 18, and 19) of a broad and channeled bottom part J, in which plays the articulated bill-section J'. At the end of the broad channel in which the bill-section J' bites to retain the twine there is an abrupt enlargement or notch at one side, (shown at $a$ in Figs. 3 and 17.) This is to give passage to the doubled twine of the knot at this point and to facilitate the slipping of the knot from the bill when the bundle is discharged.

Referring now to Fig. 3, it will be seen that the knotting-bill stands at right angles to the lay of the twine as carried across it by the needle and does not at this time trend toward the twine-holder, as is the case in a large number of other machines, to promote the discharge of the bundle. This advantage of holding this bill at right angles is twofold. First, it tends to prevent the twine from slipping off and does away with the stationary finger and supplemental latch-finger for holding the twine on the bill in this position, and, secondly, it gives a larger clear space for the twine-holder and its knives to rotate in, and consequently the knives may be made much longer to effect the cutting of a longer end of twine to be caught in the clamp, as hereinbefore described.

I will now describe how the knot is shipped or slid from the bill when the bundle is tied and is to be discharged.

Figure 16:
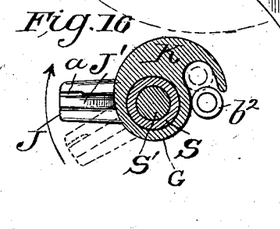
Figures 17, 18, 19:
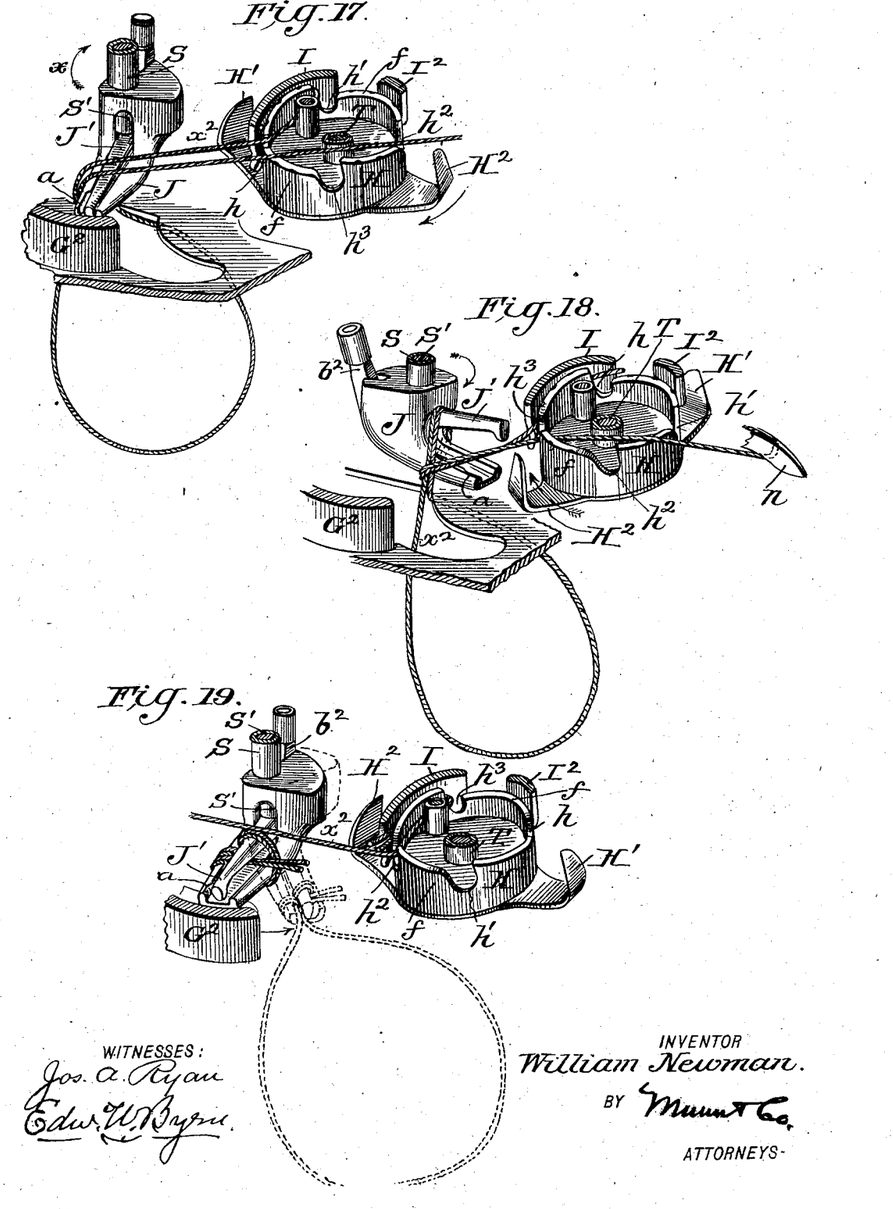
Figs. 17, 18, and 19 are views in perspective of the twine-holder and knotting-bill, showing the different phases of their movement in tying a knot.

Although my knotting-bill stands in the starting position at right angles to the run of the twine and pointing away from the twine-holder and after making a complete revolution to form the knot comes again to this position, (which is unfavorable for discharging the knot,) yet just before the knot is to be thrown off the driving devices for rotating the knotting-bill are automatically disconnected, and the knotting-bill is allowed from the stress of the bundle to drop back to the rear or trend toward the twine-holder to a favorable position for casting off the knot. This result is best illustrated in Figs. 17, 18, 19. In Fig. 17 the knotting-bill J J' is seen trending or pointing away from the twine-holder H, with the twine laid across the bill, so that it cannot possibly slip off. The knotting-bill then rotates about its vertical axis in the direction indicated by the arrow $x$. When it has made three-quarters of a revolution, as in Fig. 18, it has looped the twine around the bill-body J and opened the hinged jaw J' preparatory to seizing the lay of the twine extending to the twine-holder. The bill then closes on the twine and pulls it through the loop, and the knife $H^2$ severs the twine from the twine-holder, and the bill then completes its revolution to the position indicated by full lines in Fig. 19, which is the same position as the starting position shown in Fig. 17. When this position, Fig. 19, is reached, the locking devices controlling the rotation of the bill-shaft are disconnected, and the tying-bill swings freely to the rear, as shown in dotted lines, in which position it trends or points toward the twine-holder, or in the direction of the discharge of the bundle. I will now describe the mechanism by which this result is obtained, reference being had more especially to Figs. 7, 8, 9, 15, and 16.

Referring to Fig. 7, the knotting-bill section J' is jointed at $b$ to the bill-head, which is fast to the hollow shaft S, carrying at its upper end the bevel-pinion $s$. The upturned end $b'$ of the bill-section has an articulated section $b^2$, bearing a friction-wheel. This end when the bill-head rotates with its shaft S causes its friction-roller to traverse the cam K, (see Figs. 15 and 16,) and this cam K being formed on the main-frame casing and being stationary causes the elbow-shaped bill-section to rock on its center and to open, as in Fig. 18, preparatory to biting the twine. The bill-section J' is (see Fig. 7) forced down by a presser rod or stem S', passing through the center of the hollow bill-shaft and pressing on the bill-section between its fulcrum and its biting-point. On top of this presser-rod is a spiral spring $S^2$, held down and adjusted as to tension by a screw-plug $S^3$, turned into screw-threads in the top of the hollow bill-shaft. The housing of this spring in this manner puts it out of the way of all harm and the possibility of clogging with trash and enables it to apply its tension to the greatest possible advantage upon the yielding section of the bill. The yielding stem S' is also housed in favorable position for lubrication and the maintenance of its sensitive and effective action with the least possible wear. By turning the screw-plug $S^3$ up or down the tension of the knotting-bill spring may be easily and accurately adjusted. This screw-plug is locked against accidental turning by a screw $s'$, which screw is tapped through the bevel-pinion $s$ and also extends through a key $s^2$, which locks this pinion to the hollow shaft and causes them to turn rigidly together. In arranging the spring within the hollow bill-shaft it is preferably made to bear on the bill-jaw through the intermediary of the stem or rod S'; but it is obvious that said spring might be extended down to and made to bear directly on the bill-jaw without altering the principle of my invention.

Figures 10, 11, 12, 13, 14:
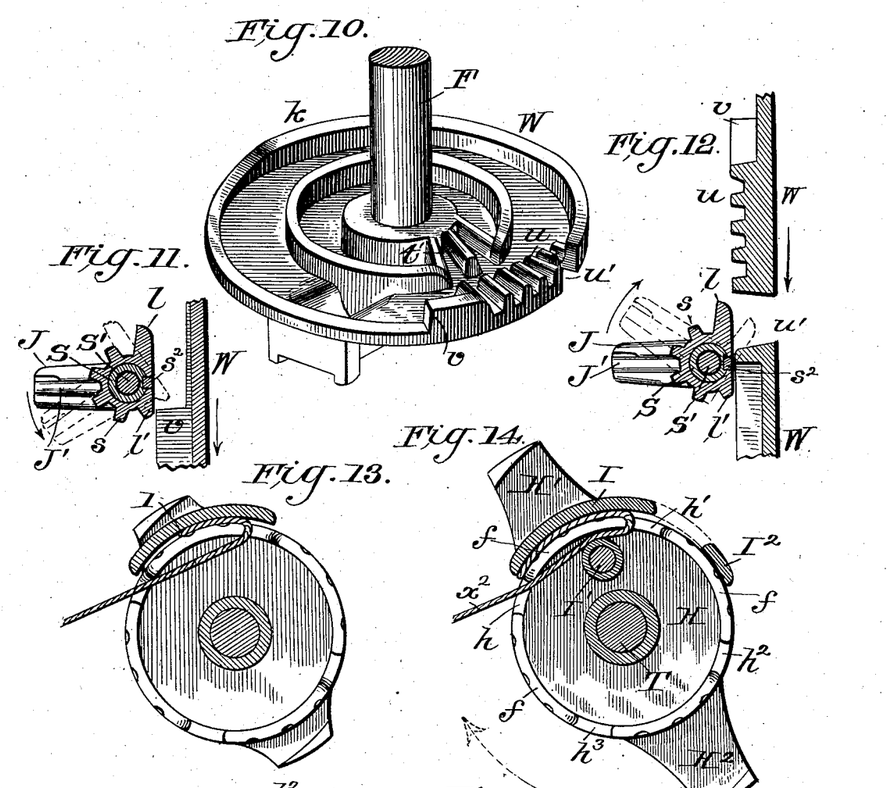
Fig. 10 is a perspective view of the driving-gear for the knotting device.
Fig. 11 is a sectional view taken through the edge of said gear and across the knotting-bill shaft, showing in dotted lines the retrograde releasing movement of the knotting-bill in discharging the bundle.
Fig. 12 is a sectional view of the same parts, taken on the curved line 12 12 of Fig. 2, showing how the lug of the knotting-bill shaft passes through the driving-gear when the knotting-bill makes a complete revolution.
Figs. 13 and 14 are sectional plan views of twine-holders, Fig. 13 being an old form introduced to elucidate the peculiarities of my twine-holder, and Fig. 14 showing my improvements.
Figure 15:
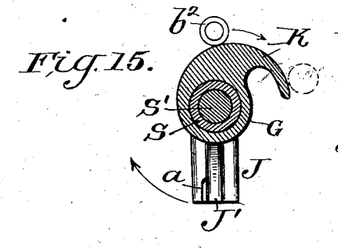
Figs. 15 and 16 are sectional details taken through the bill-opening cam, showing different positions of the same.

Referring now to Fig. 10, it will be seen that the wheel W has in its segment of teeth $u$ a notch $u'$ near one end of said teeth, which notch passes entirely through the edge of the wheel. A little beyond the other end of these teeth there is an abrupt shoulder $v$, and from $v$ to $k$ the flanged crown of the wheel is cut out to cam $k$, while from $k$ to $u'$ it is a crown of uniform height. These parts are directly related to the knotter-bill shaft, as seen in Figs. 11 and 12. The bevel-pinion $s$ on the bill-shaft has one flat side $l\,l'$, with one side $l$ extended as a lug. This flat side of the bevel-pinion rides on the crown-flange of the wheel whenever the knotter-bill is stationary; but when the bevel-pinion is engaged by the teeth $u$ of the wheel the knotter-bill is rotated. In Fig. 12 the bevel-pinion $s$ of the knotter-bill shaft is about to be engaged by the teeth $u$ of the wheel to rotate the knotter-bill, and the notch $u'$ of the wheel is in position to allow the lug $l$ of the bevel-pinion to pass through it whenever the bill is rotated by the engagement of the teeth $u$ of the wheel with the bevel-gear $s$. When the knotting-bill has made a complete revolution and tied the knot, then the shoulder $v$ of the wheel comes opposite the flat face of the bevel-gear, as seen in Fig. 11, and as soon as said shoulder passes by said flat face there is nothing to hold the knotting-bill against drifting back, and it therefore drops back to the position shown in dotted lines in Figs. 11 and 19 from the pull of the bundle, the lug $l$ serving to prevent the pinion from turning the wrong way if from any cause it should happen to tip forward. It would in that case slide along the face of the cam and right itself. To permit this dropping back of the knotter-bill, the elbow end $b^2$ of the knotter-bill section must have a cavity to recede into. This is shown in Fig. 16, where the end $b^2$ of the knotter-bill is seen about to recede into the cavity after it has dropped off the end of cam K. As there may be some straw or trash or piece of twine in the knotter-bill, it is possible that it may not close perfectly, and hence this would not allow the end $b^2$ to drop in close enough to the center to enter said recess or cavity if the bill-jaw and its extension $b^2$ were rigid. Hence I make the upper extension $b^2$ of the bill-section J' articulated about the point $b$, so that it can close to the dotted position in Fig. 8 even if the mouth of the bill is not shut tight, and therefore the upper end $b^2$ may enter the recess under the cam K, Figs. 15 and 16, even if there be trash under the movable section J' of the bill. This articulation of the vertical arm of the bill-jaw is also important, as in discharging the knot from the bill it prevents the jaw J' from being rigidly held by the recess, and thus allows the bill-jaw to slightly rise as the knot comes off.

In pointing out further important results attained by the construction and arrangement of the knotting-bill and accessories as thus described I would state that the knotting-bill works free and has a large clearance, and the notch $a$ in the side of the bill gives room for the double portion of the knot to be pulled off without straining the twine or breaking the knot. The vertical arm $b^2$ of the articulated jaw of the knotter-bill (see Fig. 7) bears on the cam K at a point a long distance from the fulcrum $b$, and therefore the longest leverage is exerted on the jaw to make the work of raising the jaw easier and subject to less disastrous wear. This part of the work of the binder is so severe ordinarily as to nearly stop the binder, for the reason that the leverage on the jaw is unfavorable and for the further reason that the vertical arm of the jaw is ordinarily made to pass between an inner and outer cam-surface with a great disadvantage of friction. The spring which acts upon this jaw is also ordinarily placed outside and is frequently tightened up unadvisedly by an unskilled operator until it produces disastrous strains and destructive wear. By placing my spring inside the hollow shaft of the bill I not only house and protect it from trash and from being tampered with, but also get room to extend up the vertical arm of the articulated jaw, so as to get the benefit of increase leverage and also allow the roller of this arm to travel on the outside of the cam-surface with very little friction compared with an arm that has to travel in a confined space against the inner surface of a spring-pressed cam-plate, as heretofore.

Having thus described my invention, what I claim as new, and desire to secure by Letters Patent, is—

1. In a grain-binder, a knotting-bill having its hinged jaw provided with an articulated member folding in one direction and rigid in the other, a spring for holding the hinged jaw shut, and a stationary cam acting upon the articulated member to open the jaw substantially as described.

2. In a grain-binder, a knotting-bill having a hinged jaw an elbow extension with an articulated member jointed thereto; combined with rotating devices for the knotting-bill constructed as described for allowing the bill to drop back with a retrograde movement after tying the knot, and a supporting-frame for the knotting-bill having a cam-surface for acting upon the articulated member of the hinged jaw and opening the latter, and having a stop-recess extending under and behind the cam for the articulated member of the elbow extension of the hinged jaw to drop into during the retrograde movement of the bill substantially as described.

3. In a grain-binder, a knotting-bill formed with an elbow extension on the inner end of its hinged jaw, said elbow extension having an articulated member carrying a roller; combined with rotating devices for the knotting-bill constructed as described for allowing the bill to drop back with a retrograde movement after tying the knot, and a supporting-frame for the knotting-bill having a cam-surface for acting upon the roller of the articulated member of the hinged jaw to open the latter, and a stop-recess extending under and behind the cam-surface for the said roller to drop into during the retrograde movement of the bill substantially as described.

4. In a grain-binder, a knotting-bill combined with rotating devices for the same, and a stationary guard or raceway closure formed on a curve of which the knotting-bill is the radius and abutting the end of said bill to hold the twine thereon against accidentally slipping off substantially as described.

5. In a grain-binder, a slotted breastplate, knotting devices mounted upon the breastplate, and a frame mounted upon said breastplate and supporting said knotting devices, said frame comprising two supporting-legs arranged upon opposite sides of the slot of the breastplate and receiving the needle between them one of said legs being detachably connected to both the breastplate below and the other leg above, and having formed on its lower end a curved guard arranged concentrically to the axis of the knotting devices, substantially as described.

6. In a grain-binder, a slotted breastplate, a knotting-bill arranged above the breastplate and a supporting-frame for the knotting-bill comprising two legs arranged upon opposite sides of the slot of the breastplate, one of said legs having constructed on it a curved guard arranged concentrically to the axis of the knotting-bill for forming a closure abutment and raceway for the knotting-bill substantially as described.

7. The combination of the knotting-bill having a driving-pinion $s$ with a flat side $l\ l'$, one side being extended to form the finger $l$, the actuating-disk W having a set of teeth $u$ on its side with a notch $u'$ at one end of the set of teeth extending entirely through the disk to receive the finger $l$, said disk having also a crown-flange with an abrupt shoulder $v$ at one end of the set of teeth and a cam $k$ substantially as and for the purpose described.

8. In a grain-binder, a knotting-bill comprising a hollow shaft, a hinged bill-jaw having an articulated portion $b^2$, a spring-seated stem housed within the hollow shaft and bearing upon the hinged bill-jaw substantially as described.

9. In a grain-binder, a knotting-bill comprising a hollow shaft, a hinged bill-jaw having an articulated portion $b^2$, a spring-seated stem housed within the hollow shaft and bearing upon the top of the hinged bill-jaw at a point between its fulcrum and its biting end substantially as described.

10. In a grain-binder, a knotting-bill having a hollow shaft, a spring housed within the same, and a subjacent and articulated bill-jaw arranged to receive the tension of said spring substantially as described.

11. In a grain-binder, a knotting-bill arranged as described to drop back after the tying movement, and a frame-casing having a stationary cam with a recess inside the same opening at the end of the cam and a bill-jaw having an arm projecting upwardly said arm having an articulated upper end arranged to traverse the cam and to drop into the recess behind it irrespective of the position of the biting end of the jaw substantially as and for the purpose described.

12. In a grain-binder, a knotting-bill shaft of tubular form, a spring arranged within the same with an adjustable screw-plug above it and meshing with threads on the inner side of the tubular shaft, a gear-wheel on the top of said shaft, a key locking the gear-wheel to said shaft, and a set-screw passing through the said key and penetrating the hollow shaft and engaging the adjustable screw-plug to lock said parts together substantially as described.

13. In a grain-binder, a twine-holder comprising a flanged disk having an external pivoted clamp bearing on the external periphery of the flange, and also an internal pivoted clamp bearing against the inner wall of said flange and means for rendering the clamps yielding substantially as and for the purpose described.

14. In a grain-binder, a twine-holder comprising a flanged disk having an external clamp bearing on the external periphery of the flange, and also an internal clamp bearing against the inner wall of said flange, both clamps being combined with and under the tension of the same spring substantially as described.

15. In a grain-binder, a twine-holder comprising a flanged disk, an external clamp bearing upon the outer periphery of the flange, an internal clamp bearing against the inner periphery of the flange, the inner clamp having a stem projecting outside the outer clamp, and bearing a screw-nut, and a spring arranged between said screw-nut and the outer clamp substantially as described.

16. In a grain-binder, a twine-holder comprising a flanged disk with outer and inner clamps both jointed upon the same center, the inner clamp having a stem projecting through the outer clamp and bearing a screw-nut, and a helical spring wound about the said stem between the nut and the outer clamp substantially as described.

17. In a grain-binder, a twine-holder comprising a flanged disk with an external clamp and spring for pressing said clamp inwardly and an internal spring-clamp, the external clamp being formed with an extended presser foot or arm to bear upon the flange beyond the internal clamp and hold the clamp true substantially as described.

18. In a grain-binder, the combination of a twine-holder consisting of a flanged and notched disk having radially-extending arms bearing knives, and an external clamp extending from notch to notch, the said knives being spaced a distance from the flange of the disk to cut off a length of twine equal in length to the space between the said notches, and a knotting-bill arranged beside the twine-holder and having its free end trending or pointing when at rest away from the twine-holder to allow the long knives of the latter to pass substantially as described.

WILLIAM NEWMAN.

Witnesses:
ANNA JOST,
E. E. WAGNER.